United States Patent Office

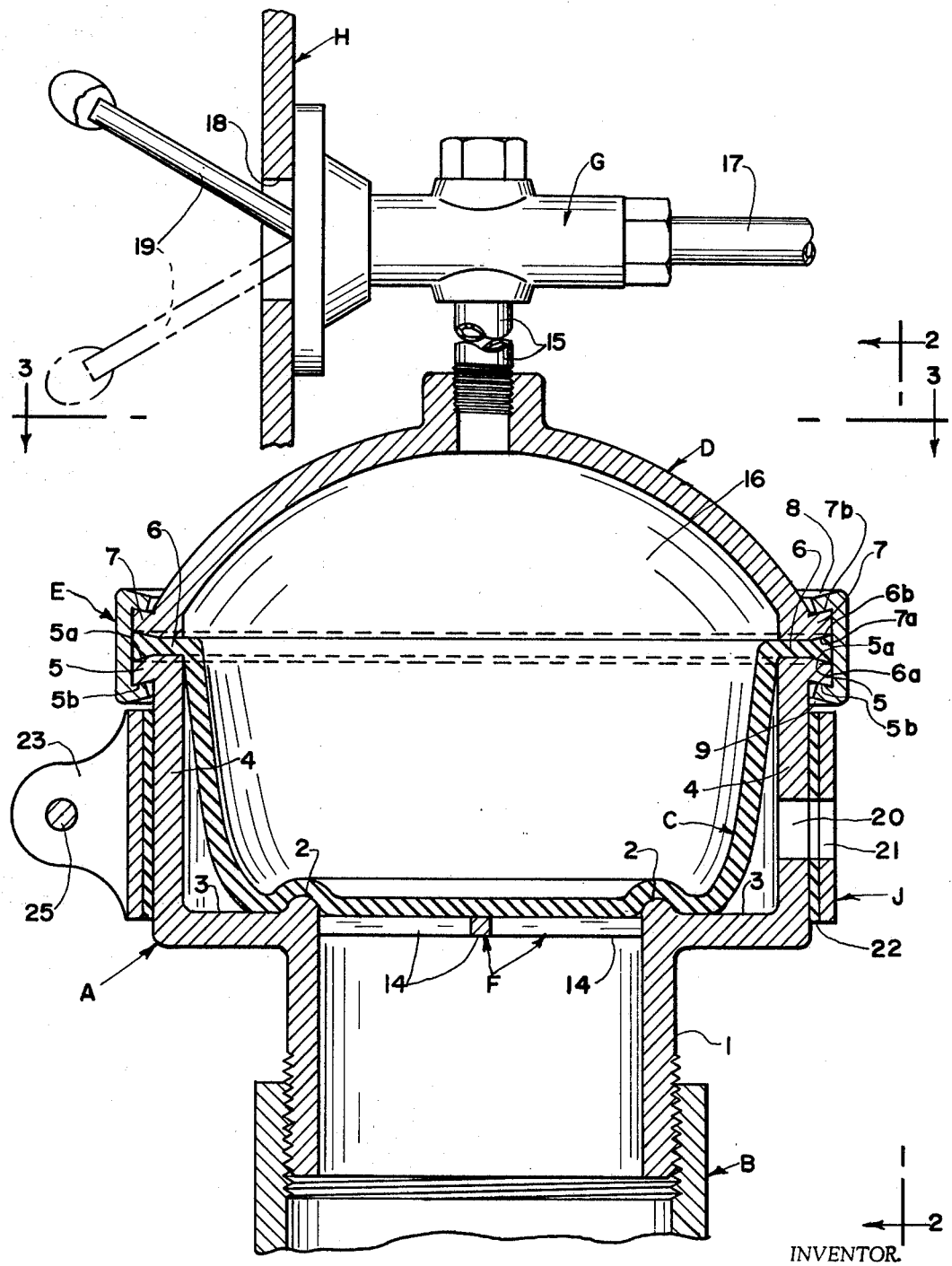

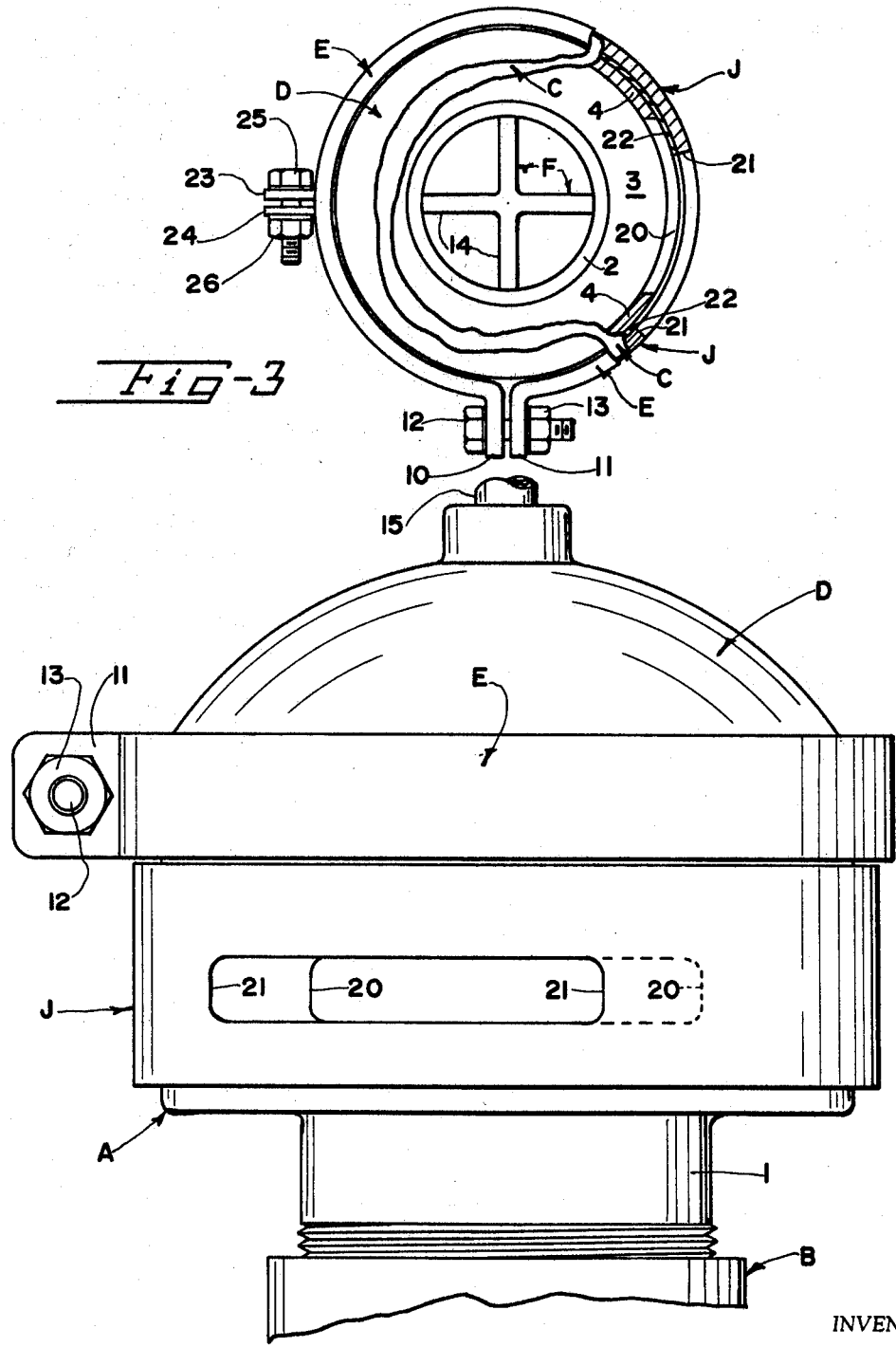

3,502,297
Patented Mar. 24, 1970

3,502,297
AIR OPERATED AND DIAPHRAGM CONTROLLING WATER SPRINKLER VALVE WITH ADJUSTABLE OUTLET
Willis W. Wardrup, 482 Mariposa Ave.,
Mountain View, Calif. 94041
Filed Aug. 30, 1968, Ser. No. 756,665
Int. Cl. F16k 7/17; B05b 1/32
U.S. Cl. 251—25                  4 Claims

ABSTRACT OF THE DISCLOSURE

A water sprinkler valve in which compressed air is used to move a diaphragm to keep the valve closed and the pressure of the water is used for moving the diaphragm to open the valve. A portion of the diaphragm extends across the water inlet when the valve is closed and a spider in the water inlet supports this diaphragm portion. The operator can adjust the air pressure to permit the water under pressure to open the valve to the desired extent to deliver a desired quantity of water. A spray adjusting ring is used to control the size of the water outlet opening and to direct the apron-like spray in the desired direction.

Cross-reference to related application

A copending patent application on an air operated adjustable water sprinkler valve, Ser. No. 645,362, now Patent No. 3,456,883, was filed on June 12, 1967. In the copending case I show a disc-shaped valve that is moved down upon a water inlet opening in a casing when air under pressure presses down upon a diaphragm to which the disc is attached. The air pressure must exceed the water pressure in order to close the valve and the water pressure will open the valve when the air pressure is reduced. In my present case the disc valve is not used and the diaphragm instead acts as a closure for the water inlet when sufficient air pressure is exerted against the diaphragm to overcome the water pressure.

BACKGROUND OF THE INVENTION

Field of the invention

In the building of roads and highways, it is frequently necessary to spread a layer of gravel or other material to provide the proper foundation. Such material must be wetted down and compacted in order to support the weight of the vehicles that will traverse the completed road or highway. The wetting of the roadbed is accomplished by trucks carrying tanks of water with pumps for delivering the water under pressure. The operator controls the valve mechanism that delivers the desired quantity of water to the roadbed. The air operated and diaphragm controlled water sprinkler valve is used for delivering the desired amount of water and a water spray adjusting ring is used for determining the type of apron-like spray that is formed and the direction the stream of water will take.

Description of the prior art

The patent to Edwin J. Hunter et al. No. 2,980,385, on a remote control valve, issue Apr. 18, 1961, discloses a valve membrane that can be expanded by air pressure for acting as a closure when the membrane is forced against a valve seat. A releasing of this air pressure permits fluid to flow through the valve and lift the membrane in so doing. No spider is provided in the fluid inlet and for supporting the portion of the membrane that extends across the inlet. In the watering of roads, great quantities of water are needed and the inner diameter of the water conveying pipe is several inches. If a spider did not support the inflated diaphragm, the portion overlying the pipe might be forced into the pipe and ruptured. The spider prevents this from taking place.

SUMMARY OF THE INVENTION

An object of my invention is to provide an air operated and diaphragm controlled water sprinkler valve with adjustable outlet in which the diaphragm is used for closing the valve. The water pressure tends to move the diaphragm to open the valve and the operator can control the pressure of air exerted on the other side of the diaphragm for causing the latter to close the valve or to open it to the desired extent for permitting water to flow from the valve. A water spray adjusting ring can be adjusted for determining the direction, width and thickness of the water spray issuing from the valve.

BRIEF DESCRIPTION OF THE DRAWINGS

FIGURE 1 is a vertical section through the device.
FIGURE 2 is an elevational view when looking in the direction of the arrows 2—2 in FIGURE 1.
FIGURE 3 is a top plan view of the device when looking in the direction of the arrows 3—3 of FIGURE 1, parts of the device being broken away to illustrate the spider in the water inlet opening.

DESCRIPTION OF THE PREFERRED EMBODIMENT

In carrying out my invention, I provide a casting indicated generally at A in FIGURE 1. This casting or casing has a water inlet tubular portion 1 that is threaded exteriorly so as to be received in the interiorly threaded end of a water pipe B. The inner rim 2 of the tubular portion 1 extends above the inner surface 3 of the bottom wall of the casing A. The casing is provided with a cylindrical wall 4 that has an outwardly extending flange 5 at its upper edge. The flange has a downwardly inclined upper surface 5a and also has a downwardly inclined lower surface 5b. The cylindrical wall 4 of the casing is larger in diameter than the diameter of the circular rim 2 so as to provide the circular surface 3 for a purpose hereinafter described.

I provide a bowl-shaped diaphragm C, see FIGURE 1, that has an outwardly extending annular flange 6 that rests on the casting flange 5. The diaphragm flange 6 has a downwardly inclined under surface 6a and an upwardly inclined upper surface 6b, and this will make the outer periphery of the flange 6 thicker. The under surface of the flange 6 rests on the upper surface of the casting flange 5.

The casing or casting A has a cover D, see FIGURE 1. The cover is dome-shaped and has an annular outwardly extending rim 7 that fits down upon the upper surface of the diaphragm flange 6. The under surface 7a of the cover rim 7 is inclined upwardly so as to coincide with the upwardly inclined upper surface 6b of the diaphragm flange 6. Also the upper surface 7b of the cover rim is inclined upwardly.

A spirit clamping ring E for securing the cover D to the casing A, has an inwardly and downwardly extending upper flange 8 and an inwardly and upwardly inclined lower flange 9, see FIGURE 1. The upper flange 8 engages the cover rim 7 while the lower flange 9 engages the casing flange 5 for securing the cover to the casing. The split clamping ring E has outwardly bent ears 10 and 11, see FIGURE 3, and a clamping bolt 12 has its shank extended through the aligned openings in the ears. A nut 13 is mounted on the threaded portion of the bolt shank and is tightened to restrict the size of the clamping ring E to make an air tight fitting between the diaphragm and the cover. The diaphragm C divides the casing A and cover D into a water receiving compartment and an air receiving compartment.

The tubular portion 1 of the casing A has a spider F, see FIGURES 1 and 3 that extends across the inlet opening of the tubular portion and is positioned a slight distance below the inner rim 2 of the casing. The spider F has a plurality of radially extending arms 14 and they will support the portion of the diaphragm C that extends across the tubular portion 1 when air under pressure forces the diaphragm into the position shown in FIGURE 1, to close the valve. This will be described hereinafter.

An air pipe 15, see FIGURE 1, communicates with the interior of an air compartment 16, formed by the cover D, and the bowl-shaped diaphragm C. The pipe 15 also communicates with a standard air valve G. An air supply pipe 17 leads from a source of compressed air, not shown, and connects with the air valve G. The air valve may be secured to any support such as the instrument panel H of the vehicle, not shown. The panel has an opening 18 through which the operating handle 19 of the air valve G, projects. When the valve handle 19 is in raised position, compressed air will flow through the pipes 17 and 15 and into the compartment 16 for pressing downwardly on the diaphragm C for pressing a central portion thereof down upon the inner rim 2 of the casing A. The diaphragm will also contact a portion of the inner surface 3 of the casing A, in order to make a water-tight seal over the inner end of the tubular portion 1. The spider F will support that portion of the diaphragm that extends across the area surrounded by the circular rim 2. The spider will prevent the compressed air from forcing any portion of the diaphragm C down into the tubular portion 1. The air pressure is sufficient to close the diaphragm C against the water pressure in the water pipe B, and tubular portion 1, and no water will enter the space in the casing A, formed by the diaphragm and the interior of the casing.

When the valve handle 19 is swung into the dot-dash line position of FIGURE 1, the valve G will close the air pipe 17 and will vent the air pipe 15 to the atmosphere. The air in the compartment 16 will escape and the water pressure will open the valve. The water pressure will lift the central portion of the diaphragm off from the circular rim 2 of the casing A, and the amount of valve opening is determined by the ratio of water pressure on one side of the diaphragm exerted against the air pressure bearing against the opposite side of the diaphragm. The amount of valve opening can be controlled by stopping the valve handle 19 in its mid position where the valve G will prevent any further escape of air from the air compartment 16. The cylindrical casing wall 4 has a water outlet opening 20 that is horizontally disposed and extends through an arc of about 90°, more or less. The outlet 20 has a height that will form the water into an apron-like stream or spray as it issues from the casing. I do not wish to be confined to any exact length or height for the water outlet opening 20.

Before describing the operation of the water sprinkler valve, I will first describe how the effective size of the water outlet opening 20 in the casing A, see FIGURES 1, 2 and 3, can be varied. A water spray adjusting split ring J, encircles the casing A, and is wide enough to close the water outlet opening 20 in the casing. Another opening 21 of the same shape and size as the casing opening 20 can be brought into registration with the opening by moving the split ring J vertically so that its upper edge contacts with the lower flange 9 of the split clamping ring E and then rotating the ring angularly until the opening 21 registers with the casing opening 20. The split ring J is then clamped into position. FIGURES 1 and 3 show the split water spray adjusting ring J provided with an inner layer of rubber 22 and the two ends of the ring have outwardly extending and parallel ears 23 and 24. A bolt 25 has its shank extending through aligned openings in the ears 23 and 24 and a nut 26 is mounted on the threaded portion of the bolt shank and is tightened for causing the ring J to make a water-tight fit against the outer surface of the cylindrical casing wall 4. FIGURES 2 and 3 show the spray adjusting ring J angularly rotated with respect to the casing A so that the casing opening 20 will be partially closed by the ring. The ring opening 21 can be about 90° more or less.

OPERATION

From the foregoing description of the varous parts of the device, the operation thereof may be readily understood. The operator adjusts the spray adjusting split ring J so that the water can issue from all of the casing opening 20 or from only a part thereof. Also the ring J can be moved downwardly on the casing and secured in position for changing the thickness of the apron-like spray.

I have already explained how the valve G operates. When the valve handle 19 is inclined upwardly as shown in FIGURE 1, the air under pressure will enter the compartment 16 and exert more pressure on the inner side of the diaphragm C and cause it to close the inner end of the tubular portion 1 of the casing A. The water pressure in the tubular portion 1 exerts less pressure against the diaphragm and the result will be a closing of the valve. The diaphragm will contact with the rim 2, spider F, and the inner surface 3 of the casing. The spider prevents any portion of the diaphragm from being forced into the water pipe.

When the handle 19 is swung into the dot-dash line position, the water pressure will lift the diaphragm C and enter the lower part of the casing A and issue out through the casing opening 20 and the opening 21 in the ring J in an apron-like spray.

I claim:
1. A device of the type described comprising:
   (a) a casing having a bottom wall with a large diameter water inlet tube extending through the bottom and communicating with a source of fluid supply under pressure, said tube opening into said casing interior, the outlet rim of the tube lying in a horizontal plane and being spaced above the bottom wall;
   (b) said casing having a cylindrical wall and a cover;
   (c) a diaphragm extending across said casing and forming a part of a fluid receiving compartment disposed between the diaphragm and the casing bottom wall and also forming a part of an air receiving compartment disposed between the diaphragm and the cover, said casing wall having a fluid outlet opening communicating with the fluid receiving compartment and opening into the atmosphere;
   (d) a spider extending across said water inlet tube and being disposed adjacent to said outlet rim;
   (e) a source of compressed air and an air valve controlling the flow of air into and out from the air compartment, said diaphragm being flexed by the air pressure in the air compartment and when this air pressure is greater than the fluid pressure in said fluid inlet tube, said diaphragm having a portion pressed down upon said outlet rim and said spider for preventing the flow of fluid into said casing, said spider preventing that portion of the diaphragm that extends across the water inlet tube from being forced into the tube by the air pressure.

2. The combination as set forth in claim 1: and in which
   (a) the bottom wall of said casing has a portion encircling the outlet rim and extending therebeyond;
   (b) whereby when the air pressure is greater than the fluid pressure in said fluid inlet tube, the diaphragm will have a portion pressed down upon the part of said bottom casing wall in addition to being pressed against said outlet rim and spider so as to increase the area of the diaphragm that acts as a closure for preventing the fluid in the tubular outlet from entering the casing.

3. The combination as set forth in claim 1: and in which
   (a) when the air valve permits the escape of air from said air compartment to a point where the fluid pressure on said diaphragm is greater than the air pressure in the air compartment, the diaphragm will be lifted from said outlet rim and will permit fluid to enter the fluid compartment and to flow out through the fluid outlet opening in the casing wall; the fluid outlet opening being in the form of an arcuate slot that extends around the wall about 90° so as to form the fluid into an apron-like spray;
   (b) a spray adjusting ring encircling said cylindrical casing wall and having an arcuate opening adapted to be brought into registry with the casing slot when said ring is adjusted on said casing; and
   (c) means for securing said ring in adjusted position.

4. The combination as set forth in claim 3: and in which
   (a) the opening in said ring is the same shape and size as the casing fluid opening, said ring being adjustable angularly on said casing to close any desired portion of the casing opening for controlling the size and direction of the apron-like spray flowing from the casing.

References Cited

UNITED STATES PATENTS

| | | |
|---|---|---|
| 2,698,711 | 1/1955 | Newcomb. |
| 2,980,385 | 4/1961 | Hunter et al. |
| 3,078,066 | 2/1963 | Moore. |

FOREIGN PATENTS

| | | |
|---|---|---|
| 656,585 | 1951 | Great Britain. |

ARNOLD ROSENTHAL, Primary Examiner

U.S. Cl. X.R.

239—597; 251—61.1